Dec. 28, 1965     K. M. GORDON     3,225,587
BEARING TORQUE TEST INSTRUMENT
Filed Aug. 13, 1963     3 Sheets-Sheet 1
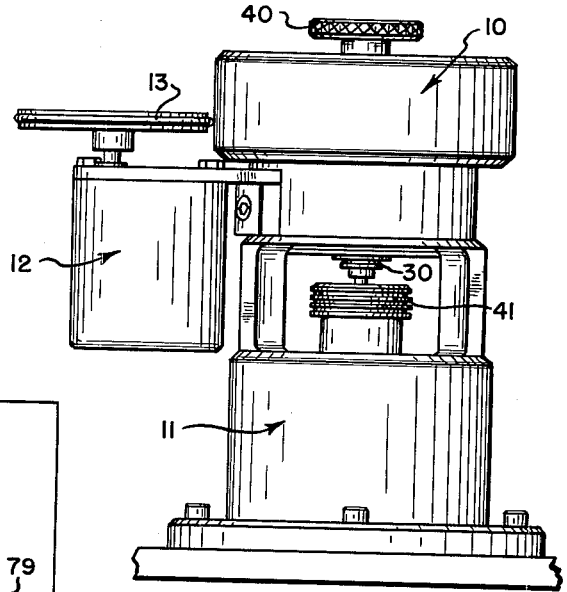
FIG. 1
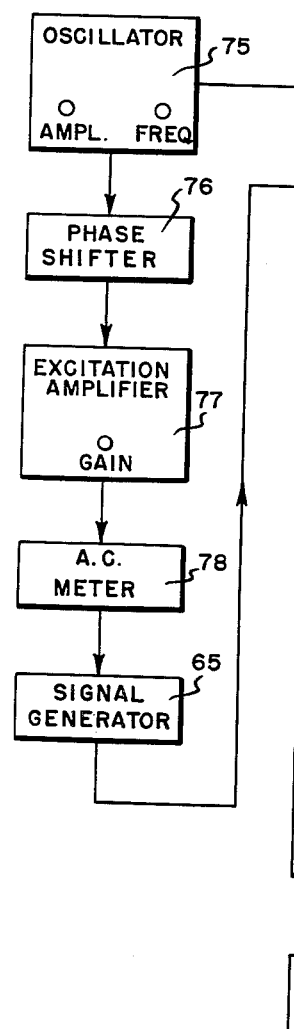
FIG. 3
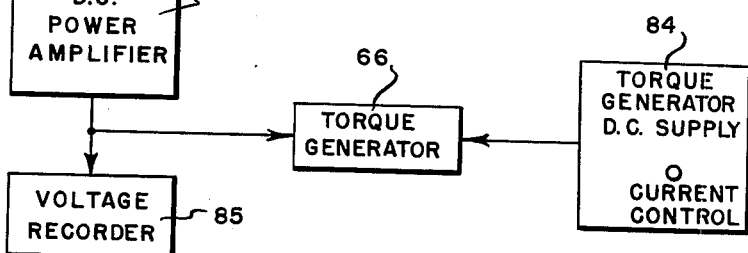
INVENTOR
Keith M. Gordon
BY Pennie, Edmonds,
Morton, Taylor and Adams
ATTORNEYS

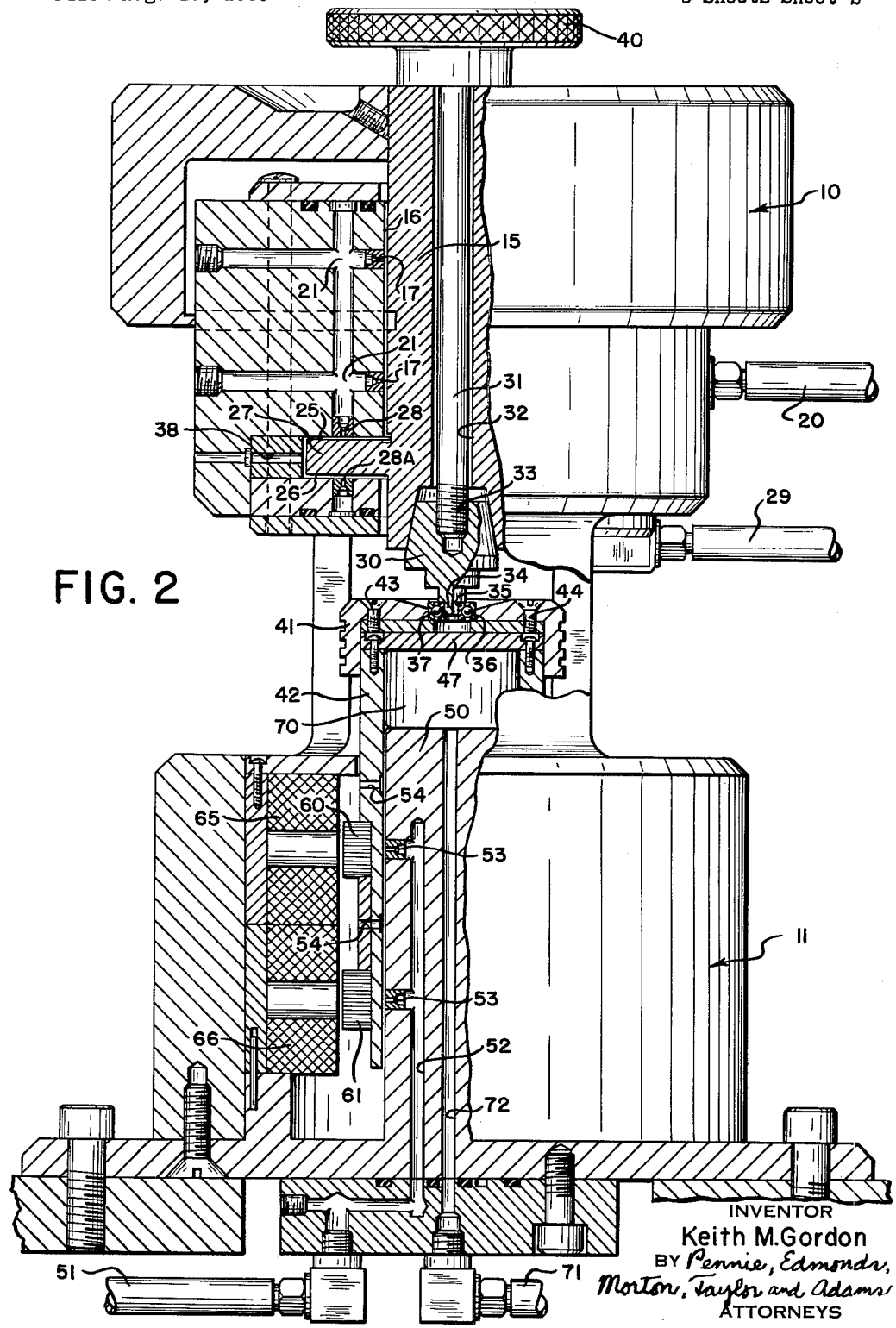

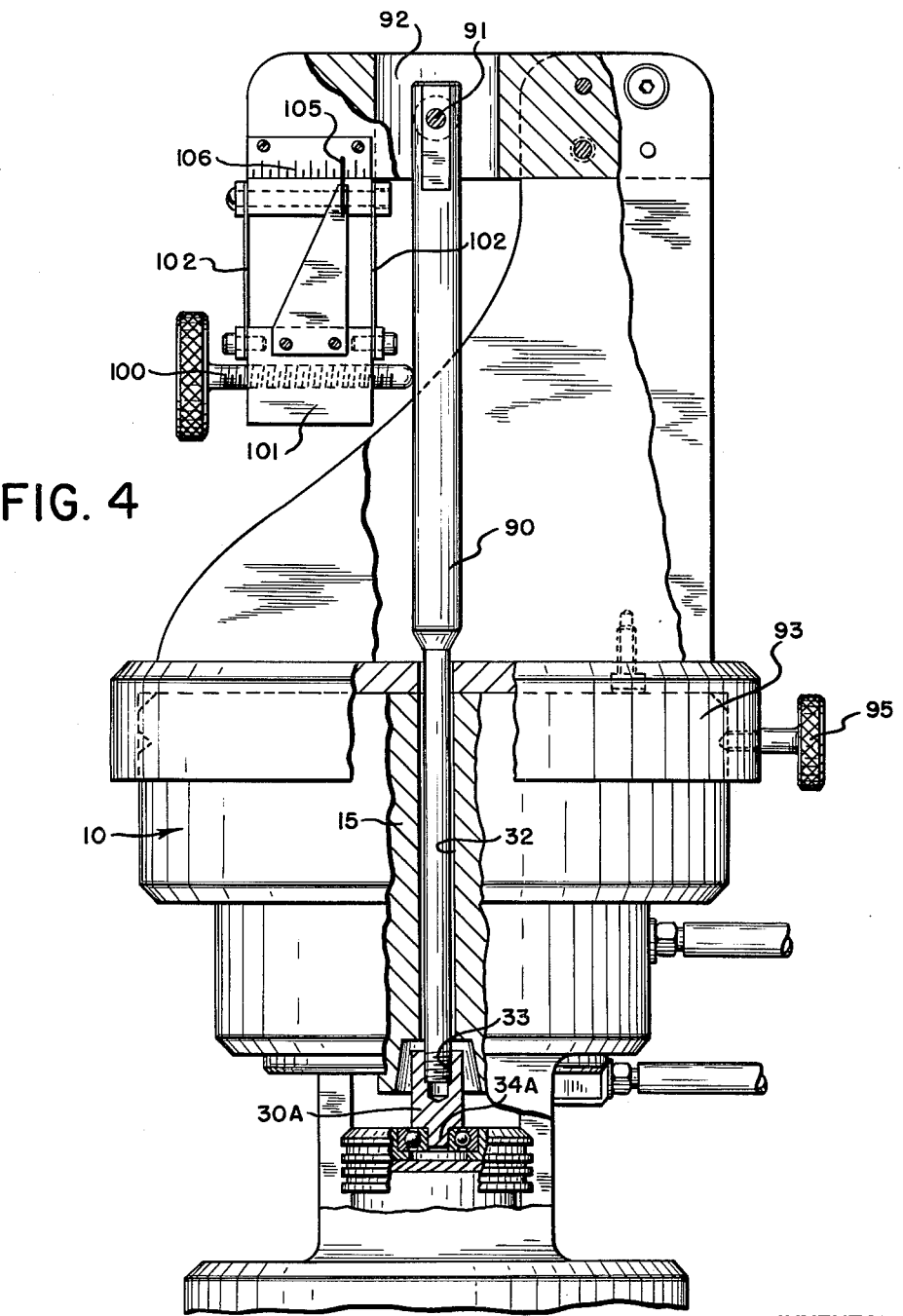

United States Patent Office 3,225,587
Patented Dec. 28, 1965

3,225,587
BEARING TORQUE TEST INSTRUMENT
Keith M. Gordon, Westmoreland, N.H., assignor to Miniature Precision Bearings, Inc., Keene, N.H., a corporation of New Hampshire
Filed Aug. 13, 1963, Ser. No. 301,845
6 Claims. (Cl. 73—9)

The present invention relates to instruments for testing bearings of the type having inner and outer race members and rolling elements therebetween, and particularly to an instrument adapted to accurately measure the running torque transmitted from one race member to the other race member by imperfections in the co-acting surfaces of the race members and the rolling elements.

The bearing test instrument provided by the present invention is particularly well suited for measuring minute defects in miniature ball bearings, including such imperfections as eccentricity, out-of-roundness, waviness, defects in finish of the co-acting race members and the rolling element surfaces and the like. The test apparatus of the present invention is also adapted to measure the running torque of other types of bearings such as pivot bearings, pre-loaded bearing pairs and complete assemblies such as gyro devices, servo motors, and the like.

It is a principal object of the present invention to provide a torque test instrument which is capable of accurately measuring the running torque impulses of bearings that are either radially loaded, axially loaded or loaded both radially and axially.

To this end, the instrument of the present invention is adapted to drive one of the race members of a test bearing at a substantially constant and uniform speed, and sense the pulses of torque transmitted from the driven race member through the rolling elements to the other race member which is restrained from rotating by a torque restraining system. The torque required to maintain the restrained race member at an equilibrium position is measured and utilized to indicate the average transmitted torque or constant torque level produced by the rolling friction and lubricant drag in the test bearing.

In accordance with the present invention, the inner race of the test bearing is mounted on a precision spindle suspended from a massive driven rotor which is rotatably supported by an air bearing. The precision spindle is supported both radially and in thrust by substantially friction-free air bearings. Thus the inner race of the test bearing is smoothly driven at a uniform speed with the massive rotor effectively ironing out (by fly-wheel action) all of the slight variations in drive motor speed. Accordingly the driven inner race of the test bearing is effectively isolated from all imperfections in the test bearing support that might otherwise be falsely sensed by the test instrument and read-out as imperfections in the bearing itself.

A low mass cylindrical sleeve is provided to mate with and receive the outer race of the test bearing. This sleeve is radially supported by an air bearing spindle disposed inside the sleeve. A small air-cell loading chamber is defined by the uppermost end of the sleeve which is closed and the top portion of the air bearing spindle disposed inside the sleeve. Means are provided for supplying an adjustably variable air pressure in this chamber to thereby apply a variable axial load on the test bearing. The rotors of a torque-sensing signal generator and a torque-restraining motor are mounted on the sleeve which is completely free to rotate with substantially no frictional restraint. The respective stators of the signal generator and the torque motor are mounted on the support base and the torque motor is energized by the amplified output signal from the signal generator.

Thus it will be seen that the torque-sensing and torque-restraining members of the present instrument are supported on an air spindle which affords substantially friction free support irrespective of the axial load applied to the outer race of the test bearing. Further it will be appreciated that the mass of the torque sensing system remains substantially invariant as a function of the axial or thrust load applied to the test bearing. Thus a uniform response sensitivity is maintained independently of the axial loads used during tests.

In accordance with a further feature of the present invention, a second spindle is provided which is disposed inside the regular rigid air bearing spindle and which is adapted to support the inner race of the test bearing and, at the same time, apply an adjustable radial load on the bearing. The second spindle is pivotally supported at the upper end thereof by the massive rotor and means are provided for forcing the spindle sidewise to exert a radial load on the inner race of the test bearing. The running torque of the test bearing may thus be measured with variable axial loading on the test bearing, with variable radial loading on the test bearing or with combinations of variable axial and radial loads.

Other objects, features, and advantages of the present invention will be apparent from the following more particular description of a preferred embodiment of the invention, as illustrated in the accompanying drawings in which:

FIG. 1 is an elevation view illustrating the various mechanical features of the bearing torque test instrument provided by the present invention;

FIG. 2 is an enlarged elevation view, partly in cross-section, of the apparatus shown in FIG. 1;

FIG. 3 is a block diagram of the electrical servo-loop torque measuring circuits used with the apparatus shown in FIGS. 1 and 2; and FIG. 4 is an elevation view, partly in cross-section, of a spindle adapter for placing a variable radial load on the test bearing.

Referring to the drawings, and particularly to FIG. 1, there is shown a bearing tester in accordance with the present invention comprising a cylindrical rotor 10 pivotally supported by housing 11 on a vertical spindle which is supported radially and axially by air bearings, details of which will be described further in connection with FIG. 2. Rotor 10 is rim driven by motor 12 through a gear reduction box (not shown) and wheel 13.

The structural features of the torque test instrument provided by the invention are illustrated in greater detail in FIG. 2. Rotor 10 is mounted on vertical spindle 15 which is supported in a cylindrical gas bearing comprising a precision cylindrical bore 16 and a plurality of gas jets 17 symmetrically displaced around the sidewalls of bore 16. Compresed gas is supplied to jets 17 from an external source (not shown) by tubular conduit 20 and supply duct 21. Rotor 10 is also supported vertically or axially by a second gas bearing comprising the upper and lower flat surfaces 25 and 26 on cylindrical plate 27. As illustrated, the cylindrical plate 27 is preferably an integral part of spindle 15, the entire spindle member having been turned on a lathe from a common piece of stock. A plurality of gas jets 28 and 28A are symmetrically disposed in the upper portion of 11 and supply air pressure against the opposing walls 25 and 26 to provide a stiff substantially friction free thrust support for spindle 15. Gas flow from jets 28 and 28A is exhausted via ducts 38 symmetrically disposed around the outer wall of 11 as shown. The lower jets 28A are supplied by tube 29 which is connected to a variable pressure compressed gas supply. Thus the supply pressures for the lower gas jets 28A and the upper jets 28 may be differentially varied to accommodate a desired range of thrusts loads on the spindle 15.

Support and drive for the test bearing is provided by a precision cylindrical spindle 15 described above. The outside diameter of the cylindrical spindle is machined to a substantially constant diameter throughout the full length of the bearing surface (major diameter), and one end of the spindle is taper-bored to receive a removable tapered arbor spindle 30. Arbor spindle 30 is retained in the tapered bore of spindle 15 by locking shaft 31 which extends through a central axial bore 32 in the main spindle 15 and into a mating threaded bore 33 in arbor spindle 30. A reduced shaft extension 34 is provided on the arbor spindle to mate snugly with the inner race 35 of the test bearing which includes ball elements 36 and outer race 37. Shaft extension 35 is accurately machined with reference to the tapered receiving bore in the main spindle 15 and the axis of rotation for the main spindle so that a common axis of rotation is maintained throughout. The tapered arbor spindle is easily removed from the main spindle by rotating knurled knob 40. This tooling feature expedites conversion of the test instrument to accommodate bearings of different sizes and types.

While the inner race of the test bearing is supported on 34 for substantially friction-free and wobble-free rotation, the outer race 37 of the test bearing is snugly mated in a central bore of a removable adapter cap 41. Adapter cap 41 is removably secured to the top portion of sleeve 42 by screws 43, 44. Sleeve 42 is cylindrical in shape having the uppermost end of the internal cylindrical chamber sealed off by capping plate 47. Sleeve 42 defines a precision cylindrical bore, the diameter of which is slightly larger than the diameter of a mating spindle 50. Sleeve 42 is supported radially by the flow of compressed gas through supply duct 51, manifold duct 52 and a plurality of gas jets 53 disposed symmetrically around the surface periphery of spindle 50. Gas flow from jets 53 is exhausted via ducts 54 symmetrically disposed around the circumference of sleeve 42. Sleeve 42 also supports the rotor 60 of a Microsyn signal generator and the rotor 61 of a Microsyn torgue generator. Stator coils 65 and 66 for the Microsyn signal generator and torque generator respectively, are fixedly mounted in the pedestal base 11 as shown.

Compressed gas is supplied to the upper chamber 70 defined by the capped over portion of sleeve 42 and the upper end surface of spindle 50 by conduit 71 and duct 72. The axial load placed on the outer race 37 of the test bearing is varied as required by adjusting the gas pressure supplied to chamber 70. The gas pressure in 70 is slowly removed or exhausted via the annular clearance between spindle 50 and sleeve 42 and then through exhaust ducts 54.

It will be appreciated that the axial loading placed on the outer race of the test bearing may be varied without in any way alterning the rotational friction or rotational mass of sleeve 42. Thus the running torque of the test bearing may be measured under varying load conditions without the introduction of spurious torgue components and without alteration of the instruments measuring sensitivity.

The torque sensing generator and the torque restoring motor for the present instrument is advantageously of the same general type as that utilized in Patent 3,027,749 to Theodore P. Barnard entitled "Bearing Torque Test Instrument." Excellent response to both short duration and long duration torque impulses is achieved with such a servo-loop type system wherein the rotor elements of both the signal generator and the torque motor are mounted in co-axial symmetry with the axis of rotation for the test bearing. The virtues of this electromechanical configuration are fully set forth in the above identified patent. A block diagram of the electrical circuits required for this type of servo-loop torque sensing system is shown in FIG. 3. A.-C. excitation voltage to the stator 65 for the signal generator is supplied from oscillator 75 which has both amplitude and frequency controls. The output of the oscillator is advantageously applied through a phase shifter 76 to a variable gain excitation amplifier 77. The gain of the excitation amplifier is metered by means of A.-C. meter 78. This excitation voltage is applied to the input terminals of the stator primary winding of the signal generator 65.

The output voltage from the secondary winding of the signal generator stator is connected to the output amplifier 79 having a gain control associated therewith. The amplified output signal from amplifier 79 is coupled to a phase sensitive detector 80. The function of the phase sensitive detector is to provide, in combination with filter 81, a D.-C. output voltage proportional to the A.-C. output voltage from amplifier 79, and to provide in combination with reference amplifier 82 the polarity shift of the D.-C. output voltage in accordance with the phase shift of the input signal from amplifier 79. The D.-C. output voltage from 81 is then applied through D.-C. power amplifier 83 to one set of secondary windings on the torque generator stator 66. D.-C. current is supplied to the remaining winding on the stator of torque generator 66 from D.-C. supply 84. The torque generator is thereby provided with a constant D.-C. current in the primary winding and a varying D.-C. current in the secondary winding, the magnitude and polarity of which causes a torque to be imparted to the rotor element of the torque generator which is opposite in direction and substantially equal to the transmitted torque which produces the output signal in the signal generator. The current control adjustment provided with D.-C. supply 84 provides a simple means for varying the excitation of the torque generator and therefore the effective spring constant $k$ of the system. Indication of the transmitted torque is effected by a measurement of the output signal from the signal generator by means of voltage recorder 85.

As indicated above the torque test instrument provided by the present invention is capable of measuring the running torque of test bearings which are operated under either variable amounts of radial loading, variable amounts of axial loading or variable amounts of combined axial and radial loadings. An auxiliary spindle 90 is provided as shown in FIG. 4 to apply a variable radial load on the inner race of the test bearing. The upper end of spindle 90 is pivotally supported on pin 91 by frame 92 as shown. Supporting frame 92 is in turn mounted on adapter cap 93 which is clamped over the top of rotor 10 and secured thereto by set screw 95. The lower extremity of spindle 90 is of a sufficiently reduced diameter to clear the bore 32 in spindle 15. The inner race of the test bearing is mounted on shaft extension 34A of adapter arbor 30A. It should be noted that 30A is not tapered to fit the taper-bore in the lower extremity of spindle 15 but rather is sufficiently small in diameter to clear the walls of this bore. Adapter 30A is secured to the lower threaded extremity of spindle 90 as shown.

Variable radial loading on the inner race of the test bearing is produced by screw member 100 which is threadably engaged in member 101. Member 101 is in turn suspended from frame 92 by spring flexures 102. As screw member 100 is turned inwardly the tip of the screw engages the wall surface of spindle 90 exerting a sidewise thrust on the inner race of the test bearing. Deflection of the spring flexures provides a measure of the applied force against spindle 90 and hence a measure of the applied radial load on the test bearing. Indicator pointer 105 attached to member 101 is provided to function in cooperation with calibrated scale 106 to indicate the total radial loading applied to the test bearing.

As indicated above the test bearing may be loaded both radially and axially. Pivot pin 91 is adapted to support any thrust loads which are applied to the test bearing by the introduction of compressed gas in chamber 70 as described above.

It will be recognized that the loading systems provided as a part of the present invention are completely independent of one another and that a wide range of combination loadings may be applied to the bearing under test. With the instrument of the present invention, thrust loads may be smoothly applied to the test bearing covering a range of zero to 20 pounds, for example, without in any way disturbing the smooth but rigid gas bearing support of spindle 15. At the same time, radial loads of several pounds may be applied to the test bearing without in any way disturbing the gas bearing support of the sleeve 42.

One of the outstanding advantages of the present invention resides in the fact that a wide variety of adapter plates 41 and inner race adapters 30 may be readily provided to accommodate testing of a number of different types of bearings and various types of complete assemblies such as gyros and the like. It should be noted that with the present test instrument, the sleeve 42 supporting the torque restraining and torque sensing elements, is supported independently of spindle 15 which drives the inner race of the test bearing. Thus the inner race adapter 30 may be readily replaced with a conical point suitable for receiving pivot bearings and the like.

While the invention has been particularly shown and described with reference to a preferred embodiment thereof, it will be understood by those skilled in the art that various changes in form and details may be made therein without departing from the spirit and scope of the invention as defined in the claims.

I claim:

1. A bearing torque test instrument for testing a bearing having inner and outer race members and rolling elements disposed therebetween comprising a base housing, a vertical drive spindle rotatably mounted within said housing and adapted to mate with the inner race member of said test bearing, gas bearing means for axially and radially supporting said drive spindle in said housing, a cylindrical rotor sleeve adapted to receive and mate with the outer race of said test bearing, said sleeve having an internal cylindrical wall surface provided as one surface of a gas bearing support for said sleeve, a cylindrical spindle mounted on said base housing and defining a plurality of gas jets, said spindle being adapted to mount inside said sleeve to cooperatively provide a substantially friction free gas bearing support for said sleeve, means for rotating said drive spindle, means for yieldably restraining the rotation of said sleeve with respect to said base, and signal generator means adapted to produce an output signal proportional to the angular displacement of said sleeve with respect to said base.

2. A bearing torque test instrument for testing a bearing having inner and outer race members and rolling elements disposed therebetween comprising a base housing, a vertical drive spindle rotatably mounted within said housing and adapted to mate with the inner race member of said test bearing, gas bearing means for axially and radially supporting said drive spindle in said housing, a cylindrical rotor sleeve having an upper capped end and a lower open end, the outer surface of said upper capped end being adapted to receive and mate with the outer race of said test bearing, said sleeve having an internal cylindrical wall surface, a cylindrical spindle mounted on said base housing and defining a plurality of gas jets, said spindle being adapted to mount inside said sleeve to provide cooperatively with the internal sleeve surface a gas bearing support for the sleeve and to provide a gas chamber between the end of said spindle and the capped end of said sleeve, means for supplying pressurized gas to said chamber, means for rotating said drive spindle, means for yieldably restraining the rotation of said sleeve with respect to said base, and signal generator means adapted to produce an output signal proportional to the angular displacement of said sleeve with respect to said base.

3. A bearing torque test instrument in accordance with claim 1 characterized in that means mounted on the drive spindle are provided for placing an adjustable radial load on the inner race of the test bearing.

4. A bearing torque test instrument in accordance with claim 2 characterized in that means mounted on the drive spindle are provided for placing an adjustable radial load on the inner race of the test bearing.

5. A bearing torque test instrument for testing a bearing having inner and outer race members and rolling elements disposed therebetween comprising a base housing, a main vertical drive spindle rotatably mounted within said housing and coaxially supporting an auxiliary loading spindle one end of which is adapted to mate with the inner race of said test bearing and the other end of which is pivotally supported to the drive spindle to permit a limited amount of movement of the bearing inner race member in substantially only the radial direction, adjustable spring means connected to said loading spindle for applying a radial load on the inner race of said test bearing, gas bearing means for axially and radially supporting said drive spindle in said housing, a cylindrical rotor sleeve adapted to receive and mate with the outer race of said test bearing, said sleeve having an internal cylindrical wall surface provided as one surface of a gas bearing support for said sleeve, a cylindrical spindle mounted on said base housing and defining a plurality of gas jets, said spindle being adapted to mount inside said sleeve to cooperatively provide a substantially friction free gas bearing support for said sleeve, means for rotating said drive spindle, means for yieldably restraining the rotation of said sleeve with respect to said base, and signal generator means adapted to produce an output signal proportional to the angular displacement of said sleeve with respect to said base.

6. A bearing torque test instrument for testing a bearing having inner and outer race members and rolling elements disposed therebetween comprising a base housing, a vertical drive spindle rotatably mounted within said housing and adapted to mate with the inner race member of said test bearing, gas bearing means for axially and radially supporting said drive spindle in said housing, a cylindrical rotor sleeve adapted to receive and mate with the outer race of said test bearing, said sleeve having an internal cylindrical wall surface provided as one surface of a gas bearing support for said sleeve, a cylindrical spindle mounted on said base housing and defining a plurality of gas jets, said spindle being adapted to mount inside said sleeve to cooperatively provide a substantially friction free gas bearing support for said sleeve, means for rotating said drive spindle, an electrical servo-loop rotation-restraining system comprising a signal generator and a torque generator each having a rotor and a stator respectively, the said rotors being mounted on said sleeve in coaxial symmetry therewith, each of the stators being mounted on said housing in operative relationship with the rotor associated therewith, said signal generator being adapted to produce an output signal in proportion to angular displacement of its said rotor, electrical connecting means for applying said output signal from said signal generator to the said torque generator, said torque generator being adapted to apply a restoring torque to its said rotor in proportion to the said output signal applied thereto to restrain the said shaft at an equilibrium position indicative of the magntiude of the bearing torque, and means for measuring the torque generator restoring torque to provide an indication representative of the bearing torque.

References Cited by the Examiner
UNITED STATES PATENTS 3,027,749   4/1962   Barnard _____ 73—9

RICHARD C. QUEISSER, *Primary Examiner.*